Patented Jan. 30, 1951

2,539,931

UNITED STATES PATENT OFFICE 2,539,931

FROTHED LATEX SPONGE RUBBER

Thomas H. Rogers, Jr., Akron, and Newell R. Bender, Cuyahoga Falls, Ohio, assignors to Wingfoot Corporation, Akron, Ohio, a corporation of Delaware No Drawing. Application March 26, 1948, Serial No. 17,378

14 Claims. (Cl. 260—723)

This invention relates to frothed latex sponge rubber.

Frothed sponge rubber is produced by converting rubber latex into a foam, shaping the foam, coagulating the foamed latex as by gelling, and curing the gelled latex.

An important use of frothed sponge rubber is as a cushioning material. The cushioning properties of sponge rubber is dependent upon its ability to be compressed. The compression resistance of sponge rubber is a function of its density. Since the materials cost of the finished sponge depends on the cost of the rubber, compounding ingredients, and other materials that enter into the final product, it is desirable to replace a percentage of these materials with a rubber-latex-substitute which will produce a sponge having the same compression resistance/weight ratio as is produced by sponge made from rubber latex without the addition of a rubber latex substitute hereinafter referred to as the control.

The use of conventional fillers such as ground rubber, etc. is not successfully used as a rubber latex substitute in the production of frothed latex sponge rubber.

Scrap frothed rubber latex sponge is a by-product of the frothed latex sponge industry. The economical disposition of this scrap sponge is a problem. The sponge is not economical to reclaim and, therefore, it is desirable to use the scrap sponge in its vulcanized state. Sponge ground to a particle size of ¼" to ½" may be used as a filler for pillows, or when the particles are bonded together with latex or a suitable cement, may be used as an inferior cushioning material in hassocks, under-rug pads, etc. However, these uses have not proven entirely satisfactory to the sponge rubber industry.

It has now been discovered that scrap sponge may be added to rubber latex and the blend frothed, gelled and vulcanized to produce a sponge in which a saving in sponge ingredients is achieved.

This discovery of the utilization of scrap sponge as a filler for frothed latex sponge, gives the industry its first practical means of disposing of its scrap in an economical manner. However, this use is not an obvious one because when ground scrap sponge of a size greater than 32 mesh is added to the latex, even in as low amounts as 5 or 10 parts of scrap per 100 parts of rubber, the weight of the finished sponge per unit volume is increased but the compression resistance does not increase proportionally. For example, sponge made with the addition of scrap sponge particles, of a size greater than 32 mesh weighs 2 lbs. more than does the control, each developing the same compression resistance. Since sponge is sold on a compression/weight ratio, the attempt to add sponge particles of greater than 32 mesh to rubber latex does not result in a saving of sponge ingredients nor does it solve the scrap sponge problem.

It has now been discovered that a saving in sponge ingredients is obtained when scrap sponge is reduced to particles of a size that pass through a 32 mesh screen or pass through a screen having smaller openings.

Any rubber latex may be used in producing the sponge rubber of this invention. The expression "rubber latex" is intended to include natural rubber latex, as well as those of polychloroprene and the rubbery butadiene-styrene and butadiene-acrylonitrile copolymers and mixtures of natural and synthetic rubber latices. It is preferred, however, to use natural rubber latex and mixtures of latices containing natural rubber latex in forming the sponge of this invention.

The frothed rubber latex sponge particles are produced by grinding scrap frothed latex sponge to a particle size ranging from 32 mesh or finer in any suitable type of grinder. The 32 mesh sponge particles are the largest size that may be used in order to produce a frothed latex sponge having a compression/weight ratio equal to the control. Sizes larger than this act merely to increase the weight of the sponge with a subsequent loss in compression value. As the size of the particles is reduced, their value as a rubber latex substitute is increased. Thus, 200 mesh sponge is preferred to 100 mesh which, in turn, is preferred to 50 mesh, and of course each of these is preferred to 32 mesh. The use of the smaller size sponge particles above 50 mesh is governed by the increasing cost involved in the sponge to these smaller particle sizes.

Another unexpected observation made with respect to the use of sponge particles of at least 32 mesh is in the fact that these sponge particles may be added in amounts up to 40% on the weight of the rubber to produce a corresponding saving in rubber latex. For each part of rubber latex sponge particles added to the rubber latex, a corresponding saving in rubber latex is realized. When 15% of rubber latex sponge particles is added, a corresponding 15% saving of rubber latex is observed. It is not desirable to add more than 40% of the latex sponge particles to the rubber latex because the resulting sponge then begins to lose its desirable physical properties, such as tear resistance and elongation. If these properties are not necessary, then a greater amount of the sponge particles may be added.

The new improved sponge is made by methods now used for making frothed sponge. The natural rubber latex, synthetic rubber latex, or mixtures of natural or synthetic rubber latices are prepared with sufficient quantities of stabilizing agents for the purpose of retaining the rubber latex and sponge particles in suspension throughout the compounding operations. Natural rubber latex is customarily stabilized by the addition of ammonia or alkali metal hydroxides, while the synthetic rubber latices are usually stabilized by any one of a wide variety of organic chemicals which have both strongly hydrophilic and strongly hydrophobic radicals. A wide variety of these compounds is known and is available commercially, for example, potassium oleate soap, rosin soaps, sodium stearate, potassium lauryl sulfate, sulfonated hydrocarbons, and sodium alkyl naphthalene sulfate.

The stabilized latex is frequently compounded with a thickening agent, such as casein, gum tragacanth, or water glass. Conventional antioxidants, such as phenyl-beta-naphthylamine, di-beta-naphthyl-para-phenylenediamine, and the heptyl-diphenylamines, and conventional accelerators such as the zinc salt of mercaptobenzothiozole, benzo-thiazyl disulfide, zinc diethyldithiocarbamate and tetramethylthiuram disulfide are then added. Other modifying agents which may be used optionally are castor oil, which improves the elastic properties of the sponge, carbon blacks which are loading agents, magnesium oxide and calcium silicate which strengthen or stiffen the sponge, paraffin wax which improves the "snap" or rebound properties of the finished sponge as well as improves its resistance to combustion and various dyes and coloring matters for improving the appearance of the composition.

The sponge-like compositions prepared in accordance with this invention may be used in identical manner to those of the prior art, and are particularly useful in the fabrication of household furniture and automobile seats.

In each of the 13 examples enumerated in the Table of Examples below, the frothed latex sponge made and tested was prepared in substantially the same manner in which the sponge of Example 6 was prepared. The preparation of the sponge in Example 6 is set forth in detail as follows:

To 108 parts of natural rubber latex containing 60% solids were added 2 parts of a 20% water dispersion of potassium oleate and 3.8 parts of a 20% water dispersion of potassium rosinate with slow agitation until thoroughly mixed into the latex. To the latex were added 58.4 parts of a synthetic rubber latex containing 60% solids (synthetic rubber latex resulting from the copolymerization of a mixture containing 70 parts of butadiene-1,3 and 30 parts of styrene) 0.61 part of a 50% water dispersion of ethyl zimate, 3.0 parts of a 50% water dispersion of zinc mercaptobenzothiazole coated with 10% of paraffin and 3.2 parts of a 50% aqueous emulsion of paraffin having a melting point of 135° F. and the batch matured with slow rolling for 18 hours at 100° F. To the matured batch were added 2.01 parts of a 50% water dispersion of sym. di-beta-naphthalene-p-phenylenediamine, 0.28 part of a 28% aqueous dispersion of carbon black, and 2.0 parts of a 20% aqueous dispersion of potassium oleate and the mixture stirred at a slow speed using a flat type stirring unit in a frothing bowl. Water was added to adjust the mixture to contain 54% rubber solids.

To 185 parts of this 54% aqueous dispersion compounded natural rubber latex was added 0.54 part of 20% aqueous dispersion of potassium oleate followed by the addition of 11 parts of 20 mesh frothed rubber latex sponge scrap particles. This was then frothed in the usual manner and 22 parts of a 40% water dispersion of a mixture of 2 parts of zinc oxide and 1 part (on the solids) of diphenyl guanidine was added to the frothed compounded latex and mixed for 30 seconds. To the frothed mixture were added 14 parts of an 18% water dispersion of sodium silicofluoride and then mixed for 19 seconds. The resulting frothed latex was poured into a mold 44.5 cm. x 33.5 cm. x 8.5 cm. in size and 56 evenly spaced lug holes 3.8 cm. in diameter and 7 cm. in length were impressed in the froth and gellation occurred in 7 minutes. The gelled sponge was cured for 10 minutes at 15 lbs. steam pressure and then washed. The washed sponge was dried for 16 hours at 160° F.

The cured sponge slab weighed 630 grams and developed a compression of 12 pounds. The weight per pound compression in grams was 52.5 and the apparent density in pounds per cubic inch was 0.00222. The tear resistance in pounds was 3.6–3.4 and the percent elongation was 150–150.

*Table of examples*

| Example | Sponge | Amt. of Scrap Added | Wt. | Compression | Wt./lb. compress. | Apparent Density | Tear | Elongation |
| --- | --- | --- | --- | --- | --- | --- | --- | --- |
|  |  | Per Cent | Grams | Pounds | Grams | lbs./in.³ | Pounds | Per Cent |
| 1 | Control | None | 570 | 11.5 | 49.5 | 0.00198 | 4.3–3.5 | 170–165 |
| 2 | do | None | 490 | 9 | 54.4 | 0.00170 | 3.8–3.6 | 195–190 |
| 3 | do | None | 500 | 10 | 50.0 | 0.00178 | 3.6–3.6 | 240–230 |
| 4 | do | None | 510 | 10 | 51.0 | 0.00181 | 3.7–2.5 | 200–160 |
| Average |  |  |  | 10.13 | 51.2 |  |  |  |
| 5 | 20 Mesh Scrap | 10 | 570 | 10 | 57.0 | 0.00203 | 3.8–3.0 | 175–150 |
| 6 | do | 10 | 630 | 12 | 52.5 | 0.00222 | 3.6–3.4 | 150–150 |
| 7 | do | 20 | 620 | 8.5 | 73 | 0.00225 | 3.6–3.2 | 170–160 |
| 8 | do | 30 | 675 | 8.5 | 79 | 0.00240 | 3.4–3.1 | 195–170 |
| Average |  |  |  | 9.75 | 65.4 |  |  |  |
| 9 | 35 Mesh Scrap | 15 | 603 | 13.5 | 45.5 | 0.00218 | 3.6–3.5 | 150–150 |
| 10 | do | 15 | 575 | 12.75 | 47.0 | 0.00209 | 3.2–3.0 | 155–150 |
| Average |  |  |  | 13.13 | 46.25 |  |  |  |
| 11 | 48 Mesh Scrap | 15 | 630 | 13 | 48.5 | 0.00224 | 4.0–4.0 | 180–175 |
| 12 | do | 15 | 590 | 11.5 | 51.3 | 0.00208 | 3.4–3.0 | 190–170 |
| 13 | do | 15 | 600 | 13 | 46.2 | 0.00221 | 3.6–3.5 | 175–165 |
| Average |  |  |  | 12.5 | 48.67 |  |  |  |

In the foregoing examples, all mesh sizes are those specified by the U. S. Bureau of Standards. W. S. Tyler Company (Cleveland, Ohio) screens were used.

In each of the foregoing examples, the compression value is obtained by determining the weight in pounds necessary to compress a circular area of 50 square inches of sponge to 75% of its original thickness.

It will be noticed that when sponge particles of 20 mesh are used, for example, as set forth in Examples 5-8, no saving is produced. When the results of Example 5 are compared with the results of Example 3, a net loss of 14% is involved where only 10% of scrap sponge was added. Thus, it can be seen that the addition of 10% of the 20 mesh scrap sponge merely added to the total weight of the finished sponge and also required the addition of 4% more sponge ingredients in order to produce a sponge developing the same compression resistance as was developed by the control.

It is also interesting to note that, based on the averages, the sponge in which 35 mesh scrap was added only weighed 46.25 grams per lb. of compressed resistance when 15% of the scrap was added as compared to an average value of 51.2 grams per lb. of compression developed for the control. Thus, in addition to saving 15% of sponge ingredients by adding 15% of scrap sponge particles of 35 mesh, a lighter weight sponge is produced. This same phenomenon is also observed with respect to the 48 mesh scrap sponge where an average value of 48.67 grams per lb. of compression is developed when 15% of the scrap sponge is added.

The advantage of adding the scrap sponge is obvious from the foregoing examples but in addition to the advantages shown, the finished sponge is no different in appearance than the control and since the other physical characteristics of the sponge containing the sponge particles are the same as the control, then both types of sponge are equally desirable under the same conditions of use.

Although the invention has been described with respect to specific examples, it is not intended that the details thereof shall be construed as limitations upon the scope of this invention except to the extent incorporated in the following claims.

We claim:

1. A frothed rubber latex sponge containing 15%, based on the weight of rubber present, of frothed rubber latex sponge particles of 35 to 50 mesh.

2. A frothed rubber latex sponge containing 15%, based on the weight of rubber present, of frothed rubber latex sponge particles of 35 mesh.

3. A frothed rubber latex sponge containing 15%, based on the weight of rubber present, of frothed rubber latex sponge particles of 48 mesh.

4. A frothed rubber latex sponge containing not more than about 40%, based on the weight of rubber present, of frothed rubber latex sponge particles of about 35 mesh to about 50 mesh.

5. A frothed rubber latex sponge containing from about 10% to about 40%, based on the weight of rubber present, of prevulcanized frothed rubber latex sponge particles of about 35 mesh to about 50 mesh.

6. A frothed natural rubber latex sponge containing from about 10% to about 40%, based on the weight of rubber present, of prevulcanized frothed rubber latex sponge particles of about 35 mesh to about 50 mesh.

7. A frothed natural rubber latex sponge containing about 15%, based on the weight of rubber present, of prevulcanized frothed rubber latex sponge particles of about 35 mesh to about 50 mesh.

8. A frothed natural rubber latex sponge containing about 15%, based on the weight of rubber present, of prevulcanized frothed rubber latex sponge particles of about 35 mesh.

9. A frothed rubbery polydiolefin latex sponge containing from about 10% to about 40%, based on the weight of rubber present, of frothed rubber latex sponge particles of about 35 mesh to about 50 mesh.

10. A frothed rubbery polydiolefin latex sponge containing about 15%, based on the weight of rubber present, of frothed rubber latex sponge particles of about 35 mesh to about 50 mesh.

11. A frothed rubbery polydiolefin latex sponge containing about 15%, based on the weight of rubber present, of frothed rubber latex sponge particles of about 35 mesh.

12. A frothed natural rubber latex sponge containing from about 10% to about 40%, based on the weight of rubber present, of frothed rubber latex sponge particles of about 35 mesh to about 50 mesh.

13. A frothed natural rubber latex sponge containing about 15%, based on the weight of rubber persent, of frothed rubber latex sponge particles of about 35 mesh to about 50 mesh.

14. A frothed natural rubber latex sponge containing about 15%, based on the weight of rubber present, of frothed rubber latex sponge particles of about 35 mesh.

THOMAS H. ROGERS, Jr.
NEWELL R. BENDER.

REFERENCES CITED

The following references are of record in the file of this patent:

UNITED STATES PATENTS

| Number | Name | Date |
| --- | --- | --- |
| 2,140,063 | Talalay | Dec. 13, 1938 |
| 2,288,686 | Daniels | July 7, 1942 |
| 2,290,613 | Greenup | July 21, 1942 |
| 2,320,425 | Glaes et al. | June 1, 1943 |